United States Patent
Glance et al.

[11] 3,937,508
[45] Feb. 10, 1976

[54] VEHICLE BODY AND BUMPER ASSEMBLY

[75] Inventors: Patrick M. Glance, Plymouth; James E. Moroney, Southfield; Peter M. Ross, Jr., Livonia, all of Mich.

[73] Assignee: Ford Motor Company, Dearborn, Mich.

[22] Filed: Dec. 26, 1974

[21] Appl. No.: 536,662

[52] U.S. Cl. .................. 293/63; 293/85; 293/96
[51] Int. Cl.² .......................................... B60R 19/02
[58] Field of Search .......... 293/1, 60, 62, 63, 69 R, 293/70, 71 R, 73, 85, 88, 89, 95, 96, 98, 99

[56] References Cited
UNITED STATES PATENTS

| 2,062,328 | 12/1936 | Morrison | 293/88 X |
| 2,187,952 | 1/1940 | Rusche | 293/62 |
| 2,691,545 | 12/1954 | Lyon | 293/62 |
| 3,817,565 | 6/1974 | Geiger | 293/62 X |
| 3,820,771 | 6/1974 | Kerr et al. | 293/73 X |

Primary Examiner—John J. Love
Assistant Examiner—Andres Kashnikow
Attorney, Agent, or Firm—John J. Roethel; Keith L. Zerschling

[57] ABSTRACT

A vehicle body and bumper assembly comprising a vehicle body having rigid side panels. A vehicle bumper is supported by an energy absorber in spaced relationship to the vehicle body for movement longitudinally of the latter upon impact. The bumper extends across the width of the body and has curved end portions terminating substantially in alignment with the side panels, the end of each curved end portion being spaced from the adjacent end of a side panel. A bridging panel bridges the space between each curved end portion and the side panel aligned with the latter. Each bumper curved end portion is movable during energy absorbing movement of the bumper into engagement with and along the inner side of the bridging panel.

Preferably, the bridging panel comprises a flexible elastomeric panel adapted to flex outwardly as the bumper curved end portion abuts its inner side. Also, the bridging panel includes a molding supported externally of the body side panel and extending toward the bumper curved end portion, the molding being constructed and arranged to accommodate outward flexing movement of the flexible panel.

5 Claims, 8 Drawing Figures

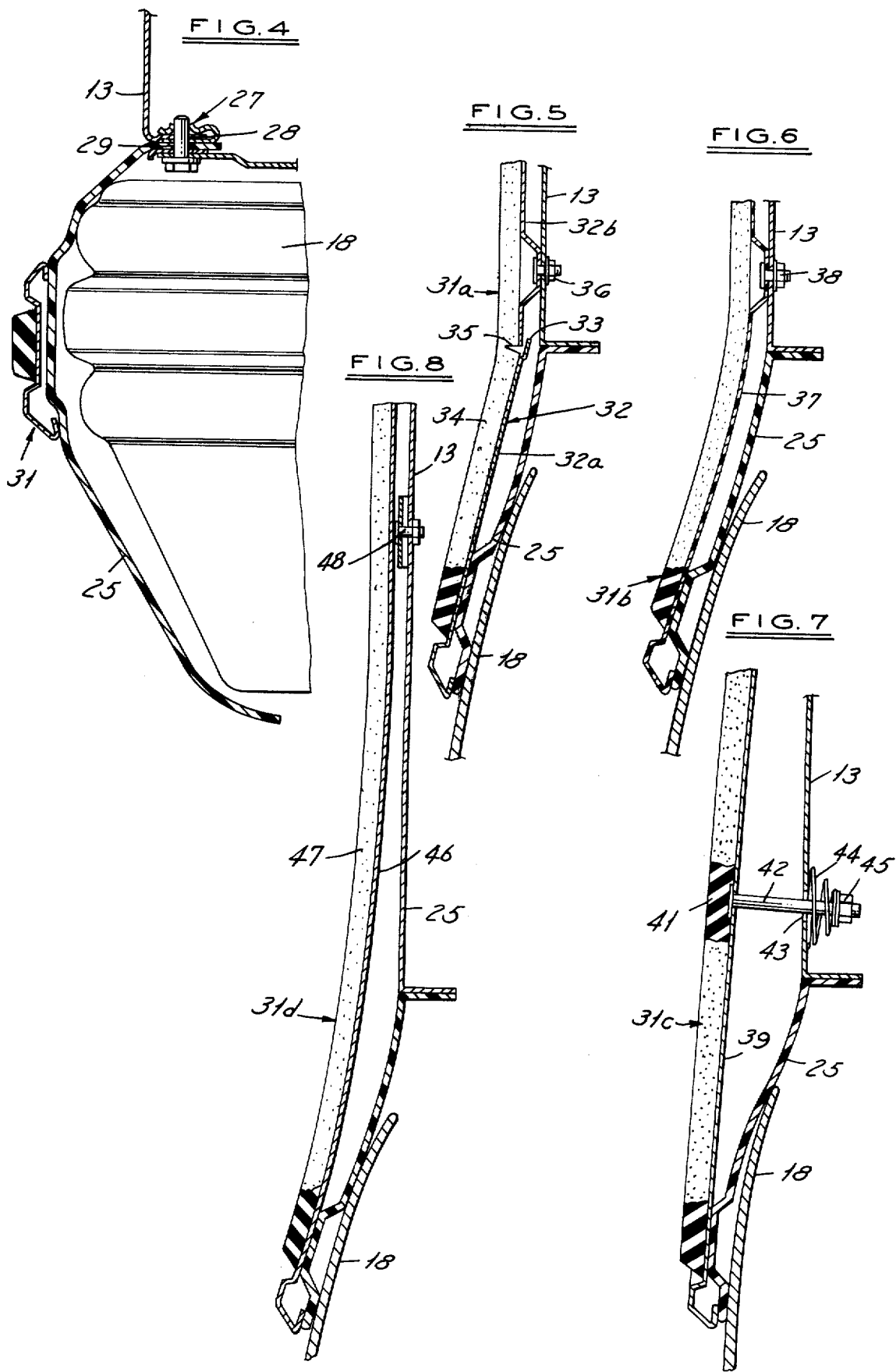

3,937,508

VEHICLE BODY AND BUMPER ASSEMBLY

BACKGROUND OF THE INVENTION

Current Federal Motor Vehicle Safety Standards require that the front bumper of the vehicle be able to absorb a 5 mile per hour impact without damage to the vehicle panels and structural members. To accomplish this, the bumpers are mounted on energy absorbing devices which permit the bumpers to move longitudinally of the vehicle body under impact. The movement is on the order of 4 to 5 inches and provision must be made for accommodating this movement by spacing the bumper at least a distance from the body panels equal to the stroke of the bumper support mechanism. To close the gap between the bumper and body panels, an elastomeric sight shield is provided which substantially covers the gap between the bumper and body members except for the gap between the curved end portions of the bumper and the body side panels.

From an aesthetic viewpoint, it is desirable that the curved end portions of the bumper present a streamlined or flush appearance with the body side panels, i.e., the fender portions of the vehicle body. This was recognized by U.S. Pat. No. 2,062,328 issued Dec. 1, 1936 to W. L. Morrison for "Bumper Device for Automobiles." This patent discloses a construction and arrangement in which the curved end portions were connected to spaced ends of the fenders by vertical extensions or panels of the sight shield, the latter being a flexible member.

It is an object of the present invention to provide a vehicle body and bumper assembly designed to stroke inside the fender or body side panel, thereby displacing a flexible body panel and body molding, if present, on the panel exterior without creating vehicle damage.

It is a further object to provide four molding alternatives, i.e., a bowed molding, a hinged molding, a spring loaded molding and a flexible molding.

SUMMARY OF THE INVENTION

The present invention relates to a vehicle body and bumper assembly comprising a vehicle body having rigid side panels. A vehicle bumper is supported by an energy absorbing means in spaced relationship to the vehicle body for movement of the latter upon impact. The bumper extends across the width of the body and has curved end portions terminating substantially in alignment with the side panels, the end of each bumper curved end portion being spaced from the adjacent end of a side panel. A bridging means, preferably a flexible elastomeric panel, bridges the space between each bumper curved end portion and the side panel aligned with the latter. Each bumper curved end portion is movable during energy absorbing movement of the bumper into engagement with and along the inner side of the bridging means.

The bridging means, as a flexible elastomeric panel, is adapted to flex outwardly as the bumper curved end portion abuts the inner side of the panel. The bridging means also preferably includes a molding means supported externally of the body side panel and extending toward the bumper curved end portion, the molding means being constructed and arranged to accommodate outward flexing movement of the flexible panel.

DESCRIPTION OF THE DRAWINGS

Other objects and features of this invention will appear in the following description and appended claims, reference being had to the accompanying drawings forming a part of this specification wherein like reference characters designate corresponding parts in the several views.

FIG. 4 is a section view taken substantially on the line 4—4 of FIG. 2;

FIG. 5 is a section view taken substantially on the line 5—5 of FIG. 2;

FIGS. 6, 7 and 8 are section views in part similar to FIG. 5 illustrating further embodiments of the body side moldings forming a component of the vehicle body and bumper assembly embodying the present invention.

DETAILED DESCRIPTION OF THE INVENTION

Figure 1:
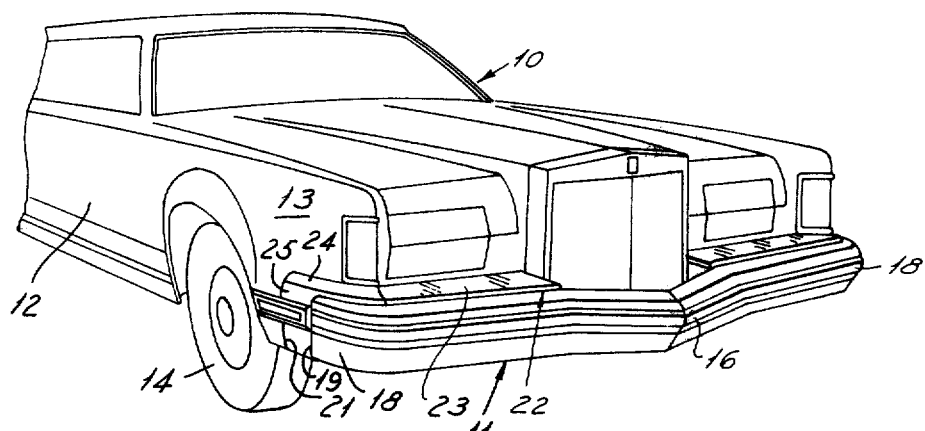
FIG. 1 is a perspective view of the front end of a vehicle embodying the vehicle body and bumper assembly of the present invention.
Figure 2:
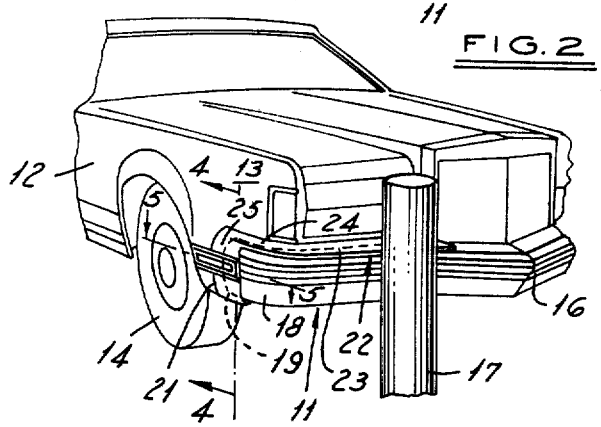
FIG. 2 is a view in part similar to FIG. 1 illustrating the vehicle body and bumper system upon impact of a stationary object by the bumper.
Figure 3:
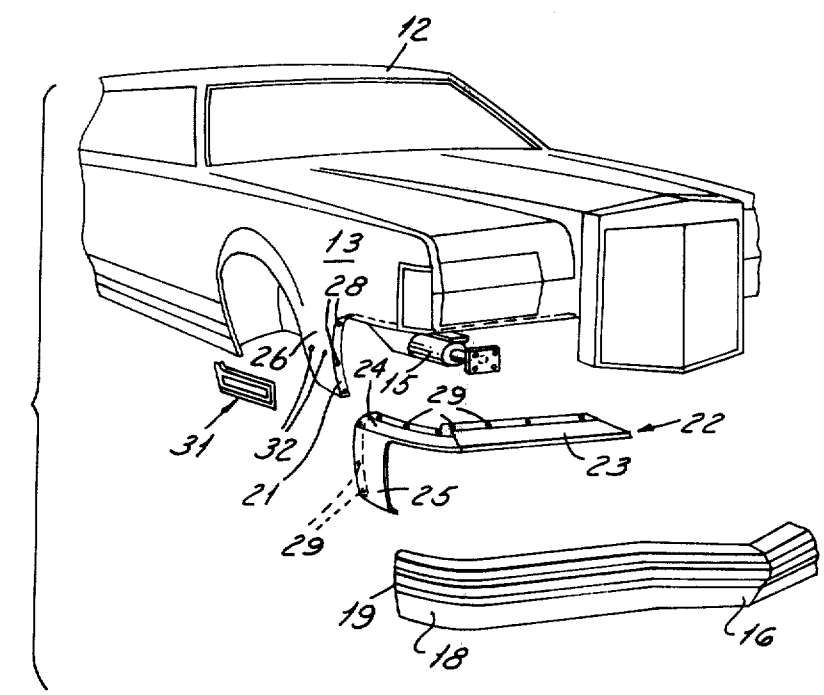
FIG. 3 is an exploded view of the components of the vehicle body and bumper assembly.

Referring now to the drawings and particularly to FIGS. 1 to 3, inclusive, there is illustrated, by way of example, a vehicle 10 having a vehicle body and bumper assembly, generally designated 11, embodying the present invention. The body 12 of the vehicle 10 has rigid side panels 13 which in the modern vehicle function as the fenders covering the running wheels 14.

A pair of spaced energy absorbing devices 15 are attached to the vehicle frame or underbody. The particulars of the energy absorbing devices 15 form no part of the present invention, but reference may be made to U.S. Pat. No. 3,794,367 issued Feb. 26, 1974 to John M. Slessor for an "Elastomeric Energy Absorber" for an exemplification of such devices. The energy absorbing devices 15 support a bumper 16 in spaced relationship to the vehicle body 12 for movement longitudinally of the latter impact, such as upon impact with a barrier or pole 17 or another vehicle (see FIG. 2).

The bumper 16 extends across the width of the vehicle body 12 and has curved end portions 18 which curve rearwardly and terminate substantially in alignment with the side panels 13. In normal relationship of the bumper 16 to the vehicle body 12, the end 19 of each curved end portion 18 is spaced from the adjacent end 21 of each side panel 13. The space between the bumper 16 and body structure is substantial. As disclosed in the elastomeric energy absorber U.S. Pat. No. 3,794,367, the energy absorber member could achieve a stroke of 6 inches, a substantial distance in excess of the stroke required to sustain and absorb a 5 M.P.H. impact. The space or gap between the body and bumper must accommodate the stroke of the energy absorber. To avoid an unsightly appearance, the space or gap is filled by an elastomeric flexible sight shield 22. The sight shield has a horizontal center portion 23, a curved end portion 24 complementary to the curvature of the bumper curved end 18 and a depending vertical panel 25. The vertical panel 25 is complementary in shape to the depending section 26 of the vertical panel 13 on each side of the vehicle body 12 and is a width, in the longitudinal direction, great enought to bridge or fill the space or gap between the panel 13 end 21 and the bumper end 19. The sight shield is bolted or held to body panel flanges by fasteners such as indicated at 27 in FIG. 4, the body flanges and sight shield marginal portion being provided with a series of aligned apertures 28 and 29, respectively, to receive the fasteners 27.

Cooperating with the flexible panel 25 to bridge the gap or space between the rigid panel 12 end 21 and the end 19 of the curved end portion 18 of the bumper 16, is a molding strip, generally designated 31. The molding strip 31 is externally secured to the rigid panel 13 by fasteners received in apertures 32 in the panel. The molding strip 31 may take any one of the several embodiments illustrated in FIGS. 5 to 8, inclusive. Before describing the features of the several embodiments of the molding strips, reference will be made to FIG. 4. FIG. 4 illustrates the effect of the flexible panel 25 of movement of the bumper 16, and more particularly the curved end 18 of the latter, longitudinally of the vehicle body. The bumper end 18 moves inside of the flexible panel 25 causing the latter to be flexed outwardly from its normal position in which it lies substantially in the plane of the body rigid side panel 13.

The end portion of the molding strip 31 overlying the flexible panel 25 is also caused to move outwardly as the panel 25 is flexed. FIGS. 5 to 8, inclusive, disclose several embodiments of the molding strip 31 adapted to accommodate the movement of the flexible panel 25.

In FIG. 5 the molding strip 31a comprises a base member 32 of rigid aluminum, the base member 32 having two sections 32a and 32b which are separated at 33 substantially in alignment with the end 21 of the rigid panel. A unitary vinyl rub strip 34 is adhesively or mechanically attached to the base member 32 and is notched on its underside at 35 to provide a plastic hinge.

As shown in FIG. 5, when the bumper curved end portion 18 causes the flexible panel section 25 to flex outwardly, the molding strip 31a also flexes about the plastic hinge 35 to accommodate the movement of the panel section 25.

The base member 32 is illustrated as being secured to the rigid panel 13 of the vehicle body by a mechanical fastener 36.

The FIG. 6 embodiment of the molding strip comprises a flexible molding strip 31b that is either stamped, cold formed or vacuum formed from a bright flexible sheet. The sheet is either aluminum foil co-extruded with cellulose acetate butyrate or co-extruded with surlyn. It may be a vacuum metallized mylar sheet bonded to clear polycarbonate. The base layer 37 of the co-extrusion receives the mechanical fasteners 38 to attach the molding strip to the body side panel section 25.

In FIG. 7 the molding strip 31c comprises a rigid aluminum base section 39 having a unitary vinyl rub strip 41 adhesively or mechanically secured to the base section. The molding strip 31c is secured to the rigid side panel 13 of the vehicle body by a spring-loaded mechanical fastener comprising an elongated stud 42 adapted to project through an aperture 43 in the body side panel 13. A compression spring 44 is trapped between the underside of panel 13 and a retention nut 45.

In operation, as the panel 25 is flexed outwardly as the curved end portion 18 of the bumper 16 passes inside of the panel, the molding strip 31c is lifted off the rigid body side panel 13. This is permitted by the compressibility of the fastener spring 44.

The FIG. 8 molding strip 31d comprises a thin stamped aluminum base section 46 made of an aluminum alloy permitting some degree of flexure. A vinyl rub strip 47 is adhesively or mechanically fastened to the base section 46. A mechanical fastener 48 secures the molding strip 31d to the panel section 13.

As the flexible panel 25 flexes outwardly as the bumper curved end portion 18 passes on the inside, the molding strip 31d bows outwardly to accommodate the panel 25 movement.

It is to be understood this invention is not limited to the exact constructions illustrated and described above but that various changes and modifications may be made without departing from the spirit and scope of the invention as defined by the following claims.

We claim:

1. A vehicle body and bumper assembly comprising:
    a vehicle body having rigid side panels,
    a bumper,
    and energy absorbing means extending between the vehicle body and the bumper supporting the latter in spaced relationship to the vehicle body for movement longitudinally of the latter upon impact,
    the bumper extending across the width of the body and having curved end portions terminating substantially in alignment with the side panels,
    each bumper curved end portion having its end spaced from the adjacent end of a side panel,
    bridging means bridging the space between each bumper curved end portion and the side panel aligned with the latter,
    each bumper curved end portion being movable during energy absorbing movement of the bumper into engagement with and along the inner side of the bridging means,
    the bridging means comprising a flexible elastomeric panel adapted to flex outwardly as the bumper curved end portion moves along the inner side thereof,
    and a molding means supported externally of the body side panel and extending toward the bumper curved end portion,
    the molding means being constructed and arranged to accommodate outward flexing movement of the flexible panel.

2. A vehicle body and bumper assembly, according to claim 1, in which:
    the molding means comprises a base member having elongated rigid base sections longitudinally separated from each other,
    a unitary elastomeric strip extending substantially the length of the rigid base sections and providing a hinge therebetween,
    and fastening means securing the base section on one side of the hinge to the body side panel.

3. A vehicle body and bumper assembly according to claim 1, in which:
    the molding means comprises an elongated rigid base member and an elastomeric strip extending the length of the latter,
    and a spring-loaded fastening means securing the base member to the body side panel,
    the fastening means permitting the base member to move angularly out of the plane of the body side panel upon outward flexure of the flexible panel.

4. A vehicle body and bumper assembly, according to claim 1, in which:
   the molding means comprises a flexible molding strip that is either stamped, cold formed or vacuum formed from a bright flexible sheet,
   the sheet being either aluminum foil co-extruded with cellulose acetate butyrate or co-extruded with surlyn;
   or a vacuum metallized mylar sheet bonded to clear polycarbonate,
   and fastening means securing at least a portion of the molding strip overlying the body side panel to the latter.

5. A vehicle body and bumper assembly according to claim 1 in which:
   the molding means comprises an elongated flexible base member and an elastomeric strip extending the latter,
   the flexible base member being adapted to bow outwardly from its point of attachment to the side panel upon outward flexure of the flexible panel,
   and fastening means securing at least a portion of the base member overlying the body side panel to the latter.

* * * * *